(12) United States Patent
Shambro, Jr. et al.

(10) Patent No.: US 11,671,677 B2
(45) Date of Patent: Jun. 6, 2023

(54) SYSTEM AND METHOD FOR PROCESSING PROGRAMING DATA USING MULTIPLE TECHNOLOGIES

(71) Applicant: APPLIED DIGITAL RESEARCH CORP., Sarasota, FL (US)

(72) Inventors: Robert Francis Shambro, Jr., Tampa, FL (US); Fred Richard Niedrich, Sarasota, FL (US); William L. Thomas, Evergreen, CO (US); Milan Patel, Brookshire, TX (US)

(73) Assignee: APPLIED DIGITAL RESEARCH CORP., Sarasota, FL (US)

( * ) Notice: Subject to any disclaimer, the term of this patent is extended or adjusted under 35 U.S.C. 154(b) by 0 days.

(21) Appl. No.: 17/353,741

(22) Filed: Jun. 21, 2021

(65) Prior Publication Data
US 2021/0314671 A1 Oct. 7, 2021

Related U.S. Application Data

(63) Continuation of application No. 16/731,826, filed on Dec. 31, 2019, now Pat. No. 11,051,079.
(Continued)

(51) Int. Cl.
*H04N 21/64* (2011.01)
*H04N 21/647* (2011.01)
(Continued)

(52) U.S. Cl.
CPC ... *H04N 21/64707* (2013.01); *H04N 21/2223* (2013.01); *H04N 21/4332* (2013.01); *H04N 21/6181* (2013.01)

(58) Field of Classification Search
CPC ........ H04N 21/64707; H04N 21/4332; H04N 21/6181; H04N 21/2223; H04N 21/44209; H04N 21/4622
See application file for complete search history.

(56) References Cited

U.S. PATENT DOCUMENTS 6,172,702 B1 * 1/2001 Simon ................ H04N 21/6143
725/105
9,491,504 B1 * 11/2016 Nijim ................ H04N 21/4383
(Continued)

*Primary Examiner* — Jefferey F Harold
*Assistant Examiner* — Timothy R Newlin
(74) *Attorney, Agent, or Firm* — Dana Legal Services; Jubin Dana

(57) ABSTRACT

Various embodiments of a system includes receiving a request to display a content and employing an antenna system to receive content data that is representative of the content. The antenna system includes a first antenna, a second antenna, and a third antenna. The system further utilizing at least three arrangements to collect the content, wherein a first arrangement includes receiving the content data broadcasted over the air to extract the content from the content data, a second arrangement includes establishing a wireless communication connection with a network node device operated by a first telecommunication service provider to collect the content data from a server, and a third arrangement includes connecting to a hot-spot having a connection to a second network node device operated by a second telecommunication service provider to collect the content data from the server. The system further transfers the content to the display component, which is collected utilizing the three arrangements.

17 Claims, 9 Drawing Sheets

Related U.S. Application Data

(60) Provisional application No. 62/788,695, filed on Jan. 4, 2019.

(51) Int. Cl.
*H04N 21/433* (2011.01)
*H04N 21/61* (2011.01)
*H04N 21/222* (2011.01)

(56) References Cited

U.S. PATENT DOCUMENTS

| | | | | |
|---|---|---|---|---|
| 10,855,351 | B1* | 12/2020 | Tsai | H04B 7/063 |
| 2003/0060218 | A1* | 3/2003 | Billerbeck | G06F 3/0231 |
| | | | | 455/500 |
| 2005/0066374 | A1* | 3/2005 | Nagamura | H04N 21/6112 |
| | | | | 348/731 |
| 2005/0128362 | A1* | 6/2005 | Teichner | H04N 21/44209 |
| | | | | 348/193 |
| 2005/0216937 | A1* | 9/2005 | Shintani | H04N 5/52 |
| | | | | 348/731 |
| 2005/0249139 | A1* | 11/2005 | Nesbit | H04N 21/4788 |
| | | | | 348/E7.071 |
| 2006/0010473 | A1* | 1/2006 | Takagi | H04H 60/32 |
| | | | | 455/179.1 |
| 2006/0020978 | A1* | 1/2006 | Miyagawa | H04B 17/27 |
| | | | | 725/72 |
| 2006/0053453 | A1* | 3/2006 | Kasamatsu | H04N 21/43637 |
| | | | | 725/81 |
| 2006/0227255 | A1* | 10/2006 | Yang | H04N 21/4524 |
| | | | | 348/731 |
| 2006/0230427 | A1* | 10/2006 | Kunkel | H04N 21/235 |
| | | | | 725/100 |
| 2007/0010202 | A1* | 1/2007 | Yamamoto | H04B 7/0848 |
| | | | | 455/63.1 |
| 2007/0011719 | A1* | 1/2007 | Lin | H04N 21/4263 |
| | | | | 348/E17.005 |
| 2007/0149247 | A1* | 6/2007 | Wong | H04M 1/72409 |
| | | | | 455/349 |
| 2008/0233951 | A1* | 9/2008 | Uchida | H04W 48/18 |
| | | | | 455/425 |
| 2009/0199256 | A1* | 8/2009 | White | H04N 21/4263 |
| | | | | 725/131 |
| 2009/0310509 | A1* | 12/2009 | Kumai | H04W 48/18 |
| | | | | 370/254 |
| 2010/0097528 | A1* | 4/2010 | Seo | H04N 7/106 |
| | | | | 348/731 |
| 2010/0215021 | A1* | 8/2010 | Li | H04N 21/4383 |
| | | | | 370/331 |
| 2011/0138424 | A1* | 6/2011 | Vlot | H04N 21/4383 |
| | | | | 725/48 |
| 2012/0044426 | A1* | 2/2012 | Jeffery | H04N 7/106 |
| | | | | 348/731 |
| 2012/0173746 | A1* | 7/2012 | Salinger | H04N 21/64322 |
| | | | | 709/230 |
| 2013/0042292 | A1* | 2/2013 | Buff | H04N 21/43637 |
| | | | | 725/127 |
| 2013/0188927 | A1* | 7/2013 | Seryakov | H04N 21/2543 |
| | | | | 707/754 |
| 2013/0227619 | A1* | 8/2013 | Lewis | H01Q 1/44 |
| | | | | 348/E5.113 |
| 2013/0263171 | A1* | 10/2013 | Calhoun | H04N 21/4622 |
| | | | | 725/110 |
| 2014/0282780 | A1* | 9/2014 | Craib | H04N 21/44209 |
| | | | | 725/54 |
| 2015/0049159 | A1* | 2/2015 | Ramkumar | H04N 21/4622 |
| | | | | 348/14.02 |
| 2017/0118531 | A1* | 4/2017 | Medina | H04N 21/6473 |
| 2018/0316448 | A1* | 11/2018 | Margolies | H04H 20/82 |
| 2018/0316954 | A1* | 11/2018 | Margolies | H04L 45/122 |
| 2020/0186861 | A1* | 6/2020 | Garner | H04N 21/2223 |

* cited by examiner

SYSTEM AND METHOD FOR PROCESSING PROGRAMING DATA USING MULTIPLE TECHNOLOGIES

CROSS-REFERENCE TO RELATED APPLICATION

This application claims priority to U.S. Provisional Patent Application No. 62/788,695, filed on Jan. 4, 2019 and entitled SET-TOP BOX FOR TV, INTERNET AND CELLULAR DEVICES. This application is a continuation of U.S. Pat. No. 11,051,079 to issue on Jun. 29, 2021 (U.S. application Ser. No. 16/731,826) filed on Dec. 31, 2019 and entitled METHOD AND APPARATUS THAT PROCESSES PROGRAMING DATA BY MULTIPLE TECHNOLOGIES. The entire disclosures of both applications are incorporated herein by reference.

TECHNICAL FIELD

This disclosure relates generally to processing over the air signal comprising television programing data. More specifically, facilitating processing of programing data by multiple technologies.

BACKGROUND

When a user wants to consume a program content, they utilize a smart-TV, mobile devices or set top boxes (STB) that process program data (e.g., program content such as movies, television shows, videos, etc.). Data for the program content can be broadcasted over the air by the content providers. Some of the broadcasted data can be free while others require a subscription. Typically, the subscription data requires a user to subscribe to a paid service that allow the user to display requested program content on their television display or portable device (e.g., smart-TV or mobile phone). Typically, the subscriber is required to subscribe to a monthly or annual service fee and is required to use the STB to process the program content. Many times, the subscriber is required to pay additional fees for using the STB. Some STB employ standard antennas to capture and process broadcasted program content signals (e.g., free over the air content) to display the requested television program using a wired/wireless via a cable connected to the STB. Many times, depending on the location of the STB, the requested television program is not available, the requested television program is not free, or the reception of broadcasted signals is low strength that the STB is unable to produce a high-quality display of the television program from the received signals.

The above-described background relating to capture and processing of program content is merely intended to provide a contextual overview of some current issues and is not intended to be exhaustive. Other contextual information may become further apparent upon review of the following detailed description.

SUMMARY

Various embodiments of a system includes receiving a request to display a content and employing an antenna system to receive content data that is representative of the content. The antenna system includes a first antenna, a second antenna, and a third antenna. The system further utilizing at least three arrangements to collect the content, wherein a first arrangement includes receiving the content data broadcasted over the air to extract the content from the content data, a second arrangement includes establishing a wireless communication connection with a network node device operated by a first telecommunication service provider to collect the content data from a server, and a third arrangement includes connecting to a hot-spot having a connection to a second network node device operated by a second telecommunication service provider to collect the content data from the server. The system further transfers the content to the display component, which is collected utilizing the three arrangements.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
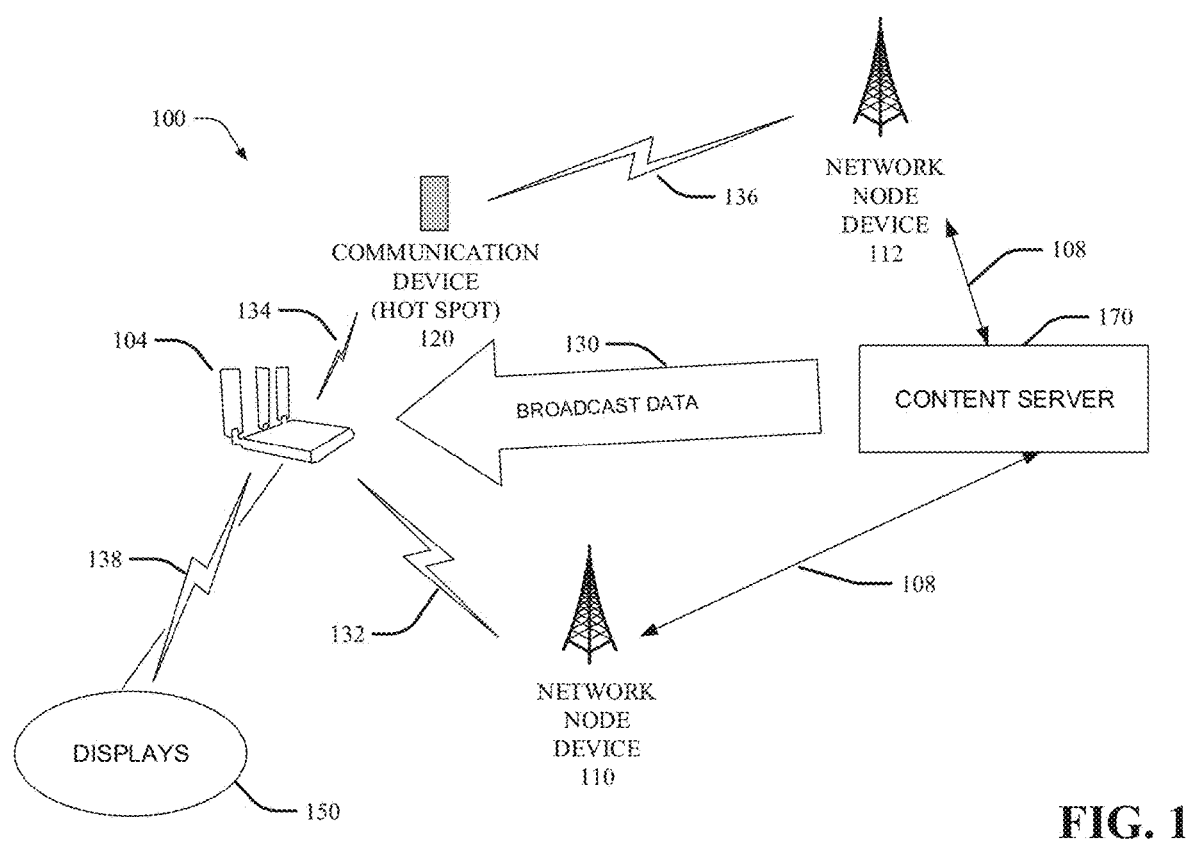
FIG. 1 illustrates a non-limiting example of a system 100 that broadcast data in accordance with various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate displaying program using multiple technologies. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate creating a mesh connectivity between network nodes in a hierarchical network. Facilitating creating a mesh connectivity between network nodes in a hierarchical network can be implemented in connection with any type of device with a connection to the communications network (e.g., a mobile handset, a computer, a handheld device, etc.) any Internet of things (IOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. In some embodiments, UE can refer to vehicle, pedestrian, or a mobile handset or any device that communicates with or without a network node. Examples of UE are target device, device to device (D2D) UE, machine type UE or UE capable of machine to machine (M2M) communication, vehicle to vehicle (V2V), vehicle to everything (V2X), PDA, Tablet, mobile terminals, smart phone, laptop embedded equipped (LEE), laptop mounted equipment (LME), USB dongles, etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception.

In some embodiments the non-limiting term radio, network node, or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, remote radio unit (RRU), remote radio head (RRH), nodes in distributed antenna system (DAS), relay device, network node, node device, etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with or take the place of policy and charging rules function ("PCRF") network elements so that policies such as quality of service and traffic management and routing can be synchronized and managed end to end.

Wireless local area networks (WLANs) have long been deployed in unlicensed spectrum bands. The IEEE 802.11 communications standard is an example of a communications system operating in these bands. A popular implementation thereof, for example, is WiFi. Numerous versions of the WiFi standard have been developed and deployed over the years such as 802.11a/b/g/n/ac/ax. One characteristic of this evolution is the ever-increasing bandwidth these communications standards can offer. For example, IEEE 802.11a started out with 20 MHz bandwidth whereby the latest generation, WiFi 6 or 802.11ax, can access up to 160 MHz. The standards associated with WiFi (e.g., all versions) define how devices can transmit using unlicensed spectrum. A device operating using WiFi, first listens on the portion of the subband (e.g., a subbands of 20 MHz) until there is no traffic before transmitting using that subband (e.g., also referred to as "sensing" or "scanning"). The sensing before transmitting applies to transmission on both uplink and downlink. Sensing is a method for checking for energy on a given subband during a time-slot. In particular, an energy detection threshold is defined per said LBT subband and whether the medium is occupied or idle is determined per LBT subband based on whether the measurement results in a value larger or smaller than said detection threshold. If for a given subband, the threshold is exceeded, it is considered occupied or busy; otherwise it is considered idle (e.g., available to transmit for a predefined timeframes/timeslot, for example, ten timeslots).

As the LTE technology is advancing the resources employed for establishing communication, transmitting data or addition of reference signals causes the resource block to be adjusted. For the first generation of communication devices, a set of resources were reserved and set of resources were available for general use (e.g., communication of data, establishing communication, etc.). The network node device and/or central controller determined how the available resources would be employed. As the LTE technology advanced, the use of available resources may be controlled by the communication device for device to device communication. For LTE Rel-14 introduced a new mode that allowed communication device to establish a NR sidelink that did not need the assistance for the network. Thus, the communication devices determined how the available resources may be employed. This allowed communication devices to create a NR sidelink using the available resources. The problem occurs when new generation of communication devices enter the communication network. The new generation of communication devices may use certain available resources for specific purposes, thereby make those available resources unavailable. This situation, the collision may occur between the older version communication devices communicating with new generation communication devices.

According to an embodiment, a system can comprise a processor and a memory that stores executable instructions that, when executed by the processor, facilitate performance of operations comprising receiving a request to display a content. The system can further facilitate employing an antenna system to receive content data that is representative of the content, wherein the antenna system comprises a first antenna, a second antenna, and a third antenna. The system can further facilitate utilizing at least three arrangements to collect the content data and to extract the content from the content data, wherein a first arrangement comprises collecting the content data broadcasted over the air, a second arrangement comprises establishing a wireless communication connection with a first network node device of a first telecommunication service provider to collect the content data from a server, and a third arrangement comprises connecting to a hot-spot having a connection to a second network node device of a second telecommunication service provider to collect the content data from the server. The system can further facilitate transmitting the content to a display component.

According to another embodiment, described herein is a method that can comprise receiving, by a device comprising a processor, a request to display a content. The method can further comprise employing, by the device, an antenna system to receive content data that is representative of the content, wherein the antenna system comprises a first antenna, a second antenna, and a third antenna. The method can further comprise utilizing, by the device, at least three arrangements to collect the content data and to extract the content from the content data, wherein a first arrangement comprises collecting content data broadcasted over the air, a second arrangement comprises establishing a wireless communication connection with a first network node device operated by a first telecommunication service provider to collect the content data from a server, and a third arrangement comprises connecting to a hot-spot having a connection to a second network node device operated by a second telecommunication service provider to collect the content data from the server. The method can further comprise transferring, by the device, the content to a display component, wherein the content is processed from the content data collected utilizing at least one arrangement out of the at least three arrangements.

According to yet another embodiment, machine-readable storage medium, comprising executable instructions that, when executed by a processor, facilitate performance of operations, receiving a request to display a content. The machine-readable storage medium can further comprise employing an antenna system to receive content data that is representative of the content, wherein the antenna system comprises a first antenna, a second antenna, and a third antenna. The machine-readable storage medium can further comprise, utilizing three arrangements to collect the content, wherein a first arrangement comprises processing content data broadcasted over the air to extract the content, a second arrangement comprises establishing a wireless communication connection with a first network node device using a first modulation scheme to collect the content from a server, and a third arrangement comprises connecting to a hot-spot having a connection to a second network node device using a second modulation scheme to collect the content from the server. The machine-readable storage medium can further comprise transferring the content to a display component, wherein the content is processed from the content data collected utilizing one of the three arrangements.

These and other embodiments or implementations are described in more detail below with reference to the drawings. Repetitive description of like elements employed in the figures and other embodiments described herein is omitted for sake of brevity.

FIG. 1 illustrates a non-limiting example of a system 100 that broadcast data in accordance with various aspects and embodiments of the subject disclosure. In one or more embodiments, the system 100 comprises a smart-box 104 that is configured to receive broadcast data 130 transmitted from a content server 170. The smart-box 104 is communicatively connected to the content server 170 via various wireless technologies, as well as, configured to receive broadcast data 130 transmitted by the content server 170. The smart-box 104 can comprise external or internal integrated modem, such as a DSL, cable or satellite modem. In some embodiments, the smart-box 104 may utilize wireless telecommunications modem to establish wireless communication using a subscriber identity module or subscriber identification module (SIM). In some embodiments, the SIM can be integrated or removable to allow the user to establish communication links using a desired telecommunication service provider (e.g., AT&T, Verizon, T-Mobile and the like).

The smart-box 104 can function as gateway between displays 150 the content server 170 via using various wireless technologies. The smart-box can provide all the necessary signal processing-receiving and decoding/decompressing. The smart-box 104 can accept commands from the user and transmits these commands back to the network using available communication links (e.g., wireless connections). The smart-box 104 is configured to function, for example, but not limited to, as a TV signal receiver, a modem, a game console, a web browser, as well as support e-mail capabilities, video-conferencing, and IP telephony over a broadband network link. In addition, smart-box 104 may be configured with additional components and functionality such as Electronic Program Guide (EPG), CD ROM, DVD player, etc.

In some embodiments, the smart-box 104 is configured to employ various wireless communication protocols, using internal and/or external antennas. The wireless communication protocols can comprise both a short-range communication links (e.g., WiFi, Bluetooth) as well as long range wireless communication links (e.g., GSM, GPRS, LTE, HSPA, WiMAX, CDMA. TDMA, OFDMA, UMTS and 3G/4G/5G radio technologies). In some embodiments, the smart-box can be configured to provide for example, but limited to, internet protocol television (IPTV), gaming services, location services, digital TV, high speed internet, VoIP services, and other unicast, multicast and broadcast IP services using one or more of the above mentioned wireless links.

In some embodiments, the smart-box 104 can receive requested program from the content server 170 using network node device 110 that is connected to the content server 170 via a connection 108 (e.g., wireless communication link). The smart-box 104 is configured to connect to the network node device 110 via use of a long-range wireless connection (e.g., a wireless connection established using various standardized radio technology, for example, but not limited to, technology defined as 3G, 4G, 5G, etc.) 132. In some embodiments, wireless connection 132 is established using a first telecommunication service provider (e.g., AT&T).

In some embodiments, the smart-box 104 is connected to a communication device 120 using a wireless connection 134, wherein the wireless connection 134 is established using a short-range wireless technology, for example, but not limited to, WiFi. The communication device is connected to network node device 112 via a wireless connection 136. The wireless connection 136 can be a long-range wireless connection established using various standardized radio technology, for example, but not limited to, technology defined as 3G, 4G, 5G, etc.). In some embodiments, wireless connection 136 is established using a second communication service provider (e.g., Verizon) that is different from the first telecommunication service provider. Both network node devices 110 and 112 are communicatively connected to the content server 170 via a connection 108 to acquire requested program content.

According to an embodiment, the data for the requested program content (e.g., ABC News) can be received at smart-box 104 from the content service via the broadcast data 130, the connection 132 and/or the connection 134. Upon processing the received data (e.g., using various standard technologies available for processing program content), the smart-box 104 can transmit data to be displayed on one or more displays 150 using wired/wireless connection 138.

In one or more embodiments, system 100 can comprise one or more user equipment UEs (e.g., smart-box 104 and communication device 120). The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE can also comprise IOT devices that communicate wirelessly.

In various embodiments, system 100 is or comprises a wireless communication network serviced by one or more wireless communication network providers. In example embodiments, a UE can be communicatively coupled to the wireless communication network via a network node (e.g., network node device 110 and 112). The network node can communicate with user equipment (UE), thus providing connectivity between the UE and the wider cellular network. The UE can send transmission type recommendation data to the network node.

System 100 can further include one or more communication service provider networks that facilitate providing wireless communication services to various UEs, including smart-box 104, via the network node device 110 and/or various additional network devices (not shown) included in the one or more communication service provider networks. The one or more communication service provider networks can include various types of disparate networks, including but not limited to: cellular networks, femto networks, picocell networks, microcell networks, internet protocol (IP) networks Wi-Fi service networks, broadband service network, enterprise networks, cloud-based networks, millimeter wave networks and the like. For example, in at least one implementation, system 100 can be or include a large-scale wireless communication network that spans various geographic areas. According to this implementation, the one or more communication service provider networks can be or include the wireless communication network and/or various additional devices and components of the wireless communication network (e.g., additional network devices and cell, additional UEs, network server devices, etc.). The network node can be connected to the one or more communication service provider networks via one or more backhaul links. For example, the one or more backhaul links can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE and the network node). While example embodiments might be described for 5G new radio (NR) systems, the embodiments can be applicable to any radio access technology (RAT) or multi-RAT system where the UE operates using multiple carriers e.g. LTE FDD/TDD, GSM/GE RAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs and the network device) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. The 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

The upcoming 5G access network may utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are planned for use in 5G systems.

Figure 2:
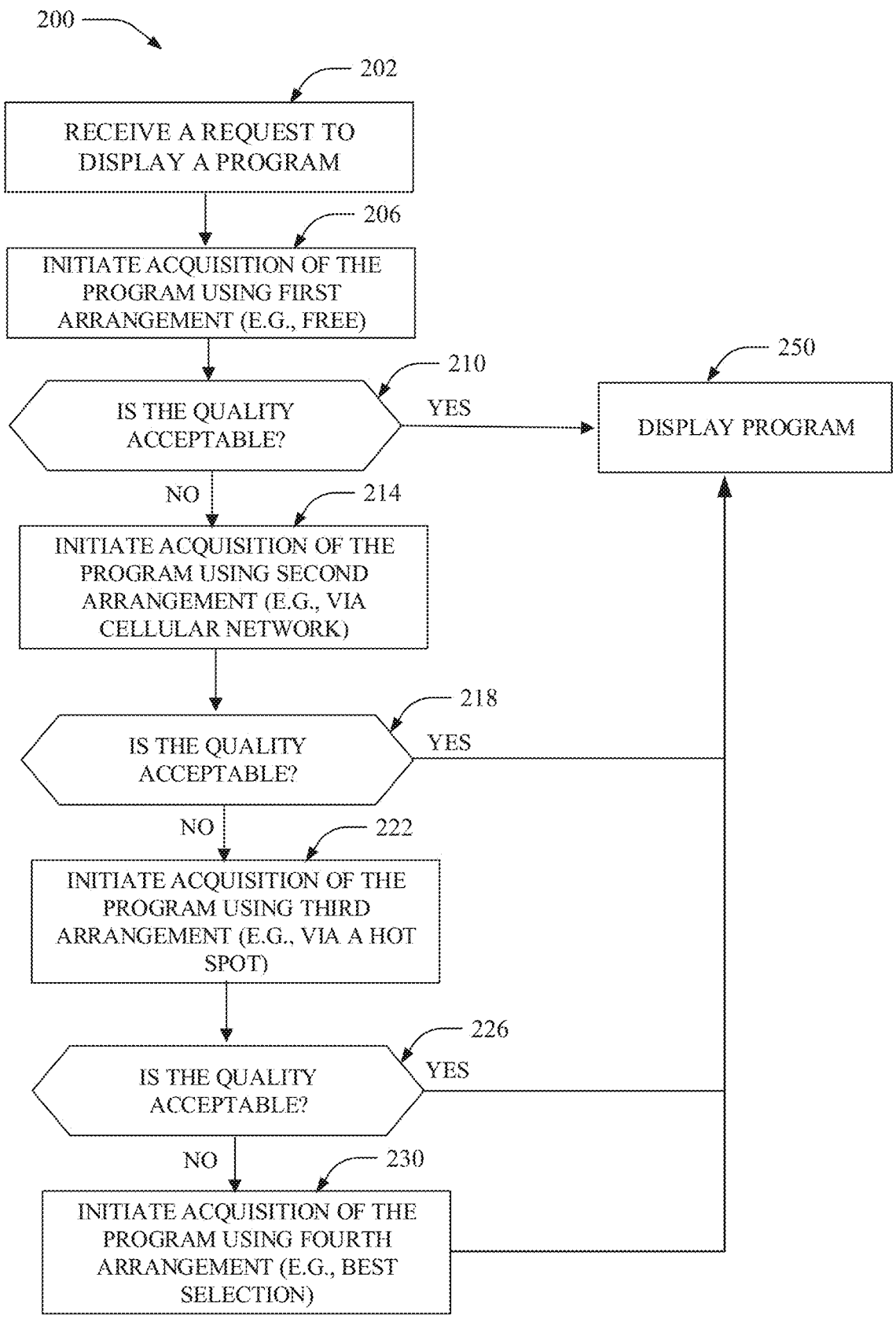
FIG. 2 illustrates an example flow diagram of operation of the smart-box according to one or more embodiments.

Referring now to FIG. 2, illustrated is an example flow diagram 200 of operation of the smart-box 104 according to one or more embodiments. For example, at 202, the smart-box 104 receives a request to display a program. A program can be television show (e.g., CSI, ABC News, Chicago PD, etc.) or a movie (e.g., Star Wars or the like). In some embodiments, the smart-box 104 is communicatively connected to a display (e.g., a television, computer, stand-alone display, iPad, iPhone, etc.), wherein an electronic program guide (EPG) is displayed. The EPG displays list of programs that a user can select. In some embodiments, the EPG is utilized to request a program (e.g., program content or content). Upon selecting program and requesting the program, at 206, the smart-box 104, initiates acquisition of the program. In an embodiment, the smart-box 104 may utilize at least three schemes (also referred to as arrangements, method, systems) to get the program for display. In first arrangement, the system (e.g., processor that controls the functionally of the smart-box 104) utilizes a first antenna to retrieve data that is broadcasted. Today, many programs are broadcasted over the air. Utilizing standard antenna and well-known algorithms, broadcasted data can be received, processed and converted into a set of data packets that can be displayed on a display. The system can determine based on the broadcast data if the requested program is available for free. Some programs are not available and require a subscription. In such a case, the program cannot be acquired using the first arrangement. If the program is available, the system determines the quality of the program. If the program quality is below an acceptable level (e.g., quality value is below a threshold value), the system will automatically utilize other arrangements to acquire the program. There are some conditions that may cause the system to determine that an alternate arrangement should be used. For example, when quality of the program is impacted based on location of the smart-box (e.g., in the mountains or in an area with lots of interference, etc.) or the signal strength of the broadcast data is low. If all the data cannot be processed smoothly, the system will assign a quality value that is low (e.g., below the threshold). At 210, the system determines is the quality of the program is acceptable. If acceptable, then at 250, the program is displayed using the first arrangement. In some embodiments, the system continues to monitor program quality and automatically make decision to utilize other arrangements.

In some embodiments, if the quality of program is not acceptable, then at 214, the system initiates acquisition of the program using a second arrangement. In some embodiments, the smart-box is provided technology that allows the smart-box 104 to establish a wireless telecommunication link (e.g., wireless communication link) with a service provider. The wireless communication link is used to establish a connection with the content provider server to retrieve the program. In an embodiment, the system utilizes the integrated technology to establish a connection with the content server to acquire (e.g., collect) data representative of the requested program. For example, using various cellular technology (e.g., 4G or 5G telecommunication technology) the system can establish a connection (e.g., internet connection via the telecommunication network) to the content server to stream the program to smart-box. If the program is available to download, the data can be downloaded to an internal memory or external memory (e.g., cloud-based server). The program can also be streamed directly from the content server using the cellular connections (also referred to as long range communication link). Although the modern technology has improved significantly, there may be situations when the signal quality of the telecommunication link may be low and thereby causing the program to get a low-quality value. For example, due to high traffic on the telecommunication network, some data packets may get dropped or delayed. This can cause jitters when displaying the program. In some embodiments, the system monitors quality of program acquired by use of the long-range technology. The system can assign a low quality value if the quality of the data packets is low or drop rate is high. The system can determine that quality is not acceptable is the quality value is below a threshold. At 218, the system checks to determine if the quality is acceptable. If quality is acceptable, then the program is continued to be displayed using the second arrangements.

In some embodiments, if the quality of program is not acceptable, then at 222, the system initiates acquisition of the program using a third arrangement (e.g., via a WiFi connected to a mobile device that has established a hot-spot network). In some embodiments, when the first arrangement and the second arrangement cannot be used, the system can request the user to establish a hot-spot on a mobile device. In some embodiments, the telecommunication provider of the mobile device, used for establishing a connection with the content server, is different from the telecommunication service provider used the integrated technology (e.g., via the SIM) of the smart-box 104. For example, the telecommunication service provider of the mobile device can be Verizon and the SIM used by the smart-box 104 provides use of AT&T network. The advantage of using the third arrangement is that it allows the system to utilize an alternate method to establish a connection to the content server. For example, if the AT&T signal strength or coverage is low, then the system can use an external device associated with another telecommunication service provider (e.g., Verizon or Sprint) to acquire the program content. Thereby providing the high quality user experience using various methods to acquire the program. If quality of the program is acceptable, the program is displayed at 250.

In some embodiments, if the quality is not acceptable at 226 (e.g., the first, second and third arrangement failed to produce acceptable quality program, then the system can utilize a fourth method at 230. The fourth method can be a present determination to use the arrangement that produces the program with the highest quality, even if lower than threshold. In some embodiments, the fourth method can be to use a combiner to patch together dropped data packets. The missing data packet can be retrieved from the second arrangement or the third arrangement.

In some embodiments, the first arrangement, the second arrangement and third arrangement can operate simultaneously, wherein the quality of the program is checked periodically. The system can switch to the arrangement that produces the highest quality to display the program. Depending on the type of service the user has established with the telecommunication provider, there may be a cost associated with use of the service (e.g., cost for using data), even if the program is free. In some embodiments, the system can select the arrangement that is most cost effective (e.g., free over paid, free over data charge, or first telecommunication service provider over another with higher cost for use of data service). For example, when the program is available free over the air (e.g., first arrangement), the system will use the first arrangement to display program over the other arrangements.

In some embodiments, an additional arrangement (e.g., a fifth arrangement) or one of the above described arrangements can be a hard-wired Ethernet connection, which connects to internet via external devices, for example but not limited to, a cable modem and delivery network like (e.g., Comcast or the like) to collect the content data.

In some embodiments, a fourth arrangement is provided to utilize a wired communication link, wherein the wire communication technology can be Ethernet technology that is used to collect the content. The smart-box 104 is configured to utilize the Ethernet to connect to the content server utilizing wired technology (e.g., data modulation and demodulation according to various internet standard technologies).

In some embodiments, wired and wireless communication links (e.g., using any of the arrangements described above) can be utilized, stand alone or in combination, to generate the content that produces the highest quality value for the content. For example, the smart-box 104 is configured to identify best modulation schemes, wired or wireless modulation, to generate the content to be displayed on a display (e.g., transmitting content to the display component, discussed below).

Figure 3:
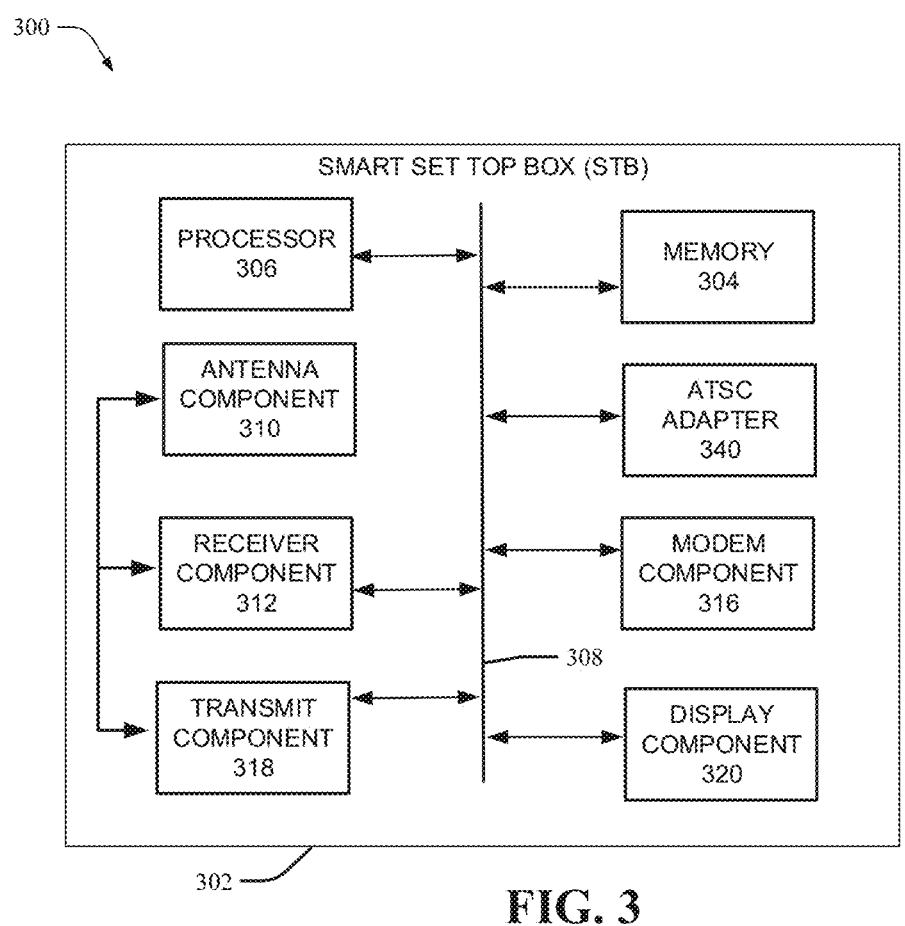
FIG. 3 illustrates a block diagram of an example, non-limiting system 300 that facilitates use of multiple technology to acquire requested program in accordance with one or more embodiments described herein.

FIG. 3 illustrates a block diagram of an example, non-limiting system 300 that facilitates use of multiple technology to acquire requested program in accordance with one or more embodiments described herein. According to some embodiments, the system 300 can comprise a smart set top box 302. In some embodiments, the smart set top box 302 can also include or otherwise be associated with a memory 304, a processor 306 that executes computer executable components stored in a memory 304. The smart set top box 302 can further include a system bus 308 that can couple various components including, but not limited to, an antenna component 310, a receiver component 312, a modem component 316, a transmit component 318 and a display component 320.

Aspects of systems (e.g., the smart set top box 302 and the like), apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

It should be appreciated that the embodiments of the subject disclosure depicted in various figures disclosed herein are for illustration only, and as such, the architecture of such embodiments are not limited to the systems, devices, and/or components depicted therein. For example, in some embodiments, the antenna component 310, the receiver component 312, the modem component 316, the transmit component 318 and the display component 320 can comprise various computer and/or computing-based elements described herein with reference to operating environment 900 and FIG. 9. In several embodiments, such computer and/or computing-based elements can be used in connection with implementing one or more of the systems, devices, and/or components shown and described in connection with FIG. 3 or other figures disclosed herein.

According to several embodiments, the memory 304 can store one or more computer and/or machine readable, writable, and/or executable components and/or instructions that, when executed by processor 306, can facilitate performance of operations defined by the executable component(s) and/or instruction(s). For example, the memory 304 can store computer and/or machine readable, writable, and/or executable components and/or instructions that, when executed by the processor 306, can facilitate execution of the various functions described herein relating to the antenna component 310, the receiver component 312, the modem component 316, the transmit component 318 and the display component 320.

In several embodiments, the memory 304 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 304 are described below with reference to system memory 906 and FIG. 9. Such examples of memory 304 can be employed to implement any embodiments of the subject disclosure.

According to some embodiments, the processor 306 can comprise one or more types of processors and/or electronic circuitry that can implement one or more computer and/or machine readable, writable, and/or executable components and/or instructions that can be stored on the memory 304. For example, the processor 306 can perform various operations that can be specified by such computer and/or machine readable, writable, and/or executable components and/or instructions including, but not limited to, logic, control, input/output (I/O), arithmetic, and/or the like. In some embodiments, processor 306 can comprise one or more central processing unit, multi-core processor, microprocessor, dual microprocessors, microcontroller, System on a Chip (SOC), array processor, vector processor, and/or another type of processor.

In some embodiments, the processor 306, the memory 304, the antenna component 310, the receiver component 312, the modem component 316, the transmit component 318 and the display component 320 can be communicatively, electrically, and/or operatively coupled to one another via the system bus 308 to perform functions of the smart STB 302, and/or any components coupled therewith. In several embodiments, the system bus 308 can comprise one or more memory bus, memory controller, peripheral bus, external bus, local bus, and/or another type of bus that can employ various bus architectures.

In several embodiments, the smart STB 302 can comprise one or more computer and/or machine readable, writable, and/or executable components and/or instructions that, when executed by the processor 306, can facilitate performance of operations defined by such component(s) and/or instruction(s). Further, in numerous embodiments, any component associated with the smart STB 302, as described herein with or without reference to the various figures of the subject disclosure, can comprise one or more computer and/or machine readable, writable, and/or executable components and/or instructions that, when executed by the processor 306, can facilitate performance of operations defined by such component(s) and/or instruction(s). For example, the antenna component 310, the receiver component 312, the modem component 316, the transmit component 318 and the display component 320, and/or any other components associated with the smart STB 302, can comprise such computer and/or machine readable, writable, and/or executable component(s) and/or instruction(s). Consequently, according to numerous embodiments, the smart STB 302 and/or any components associated therewith, can employ the processor 306 to execute such computer and/or machine readable, writable, and/or executable component(s) and/or instruction(s) to facilitate performance of one or more operations described herein with reference to the smart STB 302 and/or any such components associated therewith.

In some embodiments, antenna component 310, can comprise one or more processors, memory, and electrical circuitry. The antenna component 310 is utilized to capture signals that are broadcasted over the air. In some embodiments, the antenna component 310, comprises a standard antenna to capture broadcasted signals representative of data required to acquired one or programs for display. In some embodiments, the antenna component 310, comprises a standard antenna and a second antenna. The second antenna can be used to establish a wireless connection with a telecommunication network (e.g., a 3G/4G/5G wireless communication systems for establishing data connection link between two or more devices). In some embodiments, the antenna component 310, comprises a standard antenna, a second antenna and a third antenna. The second antenna can be used to establish a wireless connection with a telecommunication network (e.g., a 3G/4G/5G wireless communication systems for establishing data connection link between two or more devices). The third antenna can be used to establish a wireless connection using a WiFi technology.

In some embodiments, the receiver component 312, can comprise one or more processors, memory, and electrical circuitry. The receiver component 312, can be utilized to receive commands from the user. In some embodiments, the receive component 312 can comprise electronic components to process information received by the antenna component 310. For example, the receive component 312 can be used to establish a receive portion using a communication link (e.g., cellular, WiFi). In some embodiments, the receive component 312 can received commands from input device, for example, but not limited to, a remote controller (not shown) and/or a wired/wireless keyboard (not shown), a mobile phone, a laptop or any portable device, which is communicatively connected to the smart-box 104. The remote controller and the keyboard can be connected via an infra-red technology, WiFi, Bluetooth, or the like. For example, when the user desires to request content, the user can utilize any of the input device mentioned above to transmit a signal that is received by the receive component 312 to initiate the acquisition of the content.

In some embodiments, the modem component 316, can comprise one or more processors, memory, and electrical circuitry. The modem component 316 can be utilized to process broadcast data, internet data packets or data packets received according the one or more wireless technology (e.g., OFDMA, WiFi, etc.). In some embodiments, the modem component 316 comprises first modem to process telecommunication data. The modem component 316 can further comprise a second modem to process WiFi data and a third modem to process broadcasted data.

In some embodiments, the transmitting component 318, can comprise one or more processors, memory, and electrical circuitry. The transmitting component 318 can transmit program data to the display, and/or transmit data to establish communication links with one or more telecommunication service providers. For example, once requested content with the highest quality is determined, the content is transmitted (e.g., data is transmitted/transferred/provided to the display component 320) to be displayed.

In some embodiments, the display component 320, can comprise one or more processors, memory, and electrical circuitry. The display component 320 facilitates displaying the requested program on an external display (e.g., television or portable devices). The display component 320 may be communicatively connected to an external display via a wire connection. The display component 320 may be communicatively connected to an external display via a wireless connection. The wireless connection can be established by using the modem component 316, the receiver component 312 and the transmit component 318.

In some embodiments, the smart-box 104 comprises an Advance Television Systems Committee (ATSC) adaptor 340. The ATSC adaptor 340 can be communicatively connected to one or more of components (e.g., receiving component 312, the transmitting component 318, etc.) described above and to the processor 306 and/or the memory 304. In some embodiments, the ATSC adaptor 340 is associated with ATSC 3.0, which a version of ATSC standards for television broadcasting created by the ATSC. ATSC 3.0 is a significant upgrade to the current ATSC 1.0 TV standard. The standard is designed to offer support for newer technologies, including HEVC for video channels with high resolutions (e.g., up to 2160p 4K resolution) at 120 frames per second, wide color gamut, high dynamic range and provides higher audio technology such as Dolby AC-4 and MPEG-H 3D Audio. In addition, ATSC 3.0 provides datacasting capabilities, and more robust mobile television support. The capabilities have also been foreseen to enable targeted advertising, audience monitoring, interactive applications, and public alerting. One of the major enhancements is to support a return path communications protocol for support of some of the new features.

In some embodiments, the smart-box 104 comprise technology (e.g., ATSC 3.0) that provides a return path communications protocol for support of some of the new features described above. The technology associated with ATSC 3.0 is an IP based protocol which is transmitted over a communication link established by one or more of the arrangements discussed above. In some embodiments, the first arrangement (e.g., over the air broadcast), may be combined with second arrangement (e.g., the wireless communications connection, and/or third arrangement (e.g., a hot-spot connection). In some embodiments, the ATSC adaptor may be utilized to enable the ATSC features.

Figure 4:
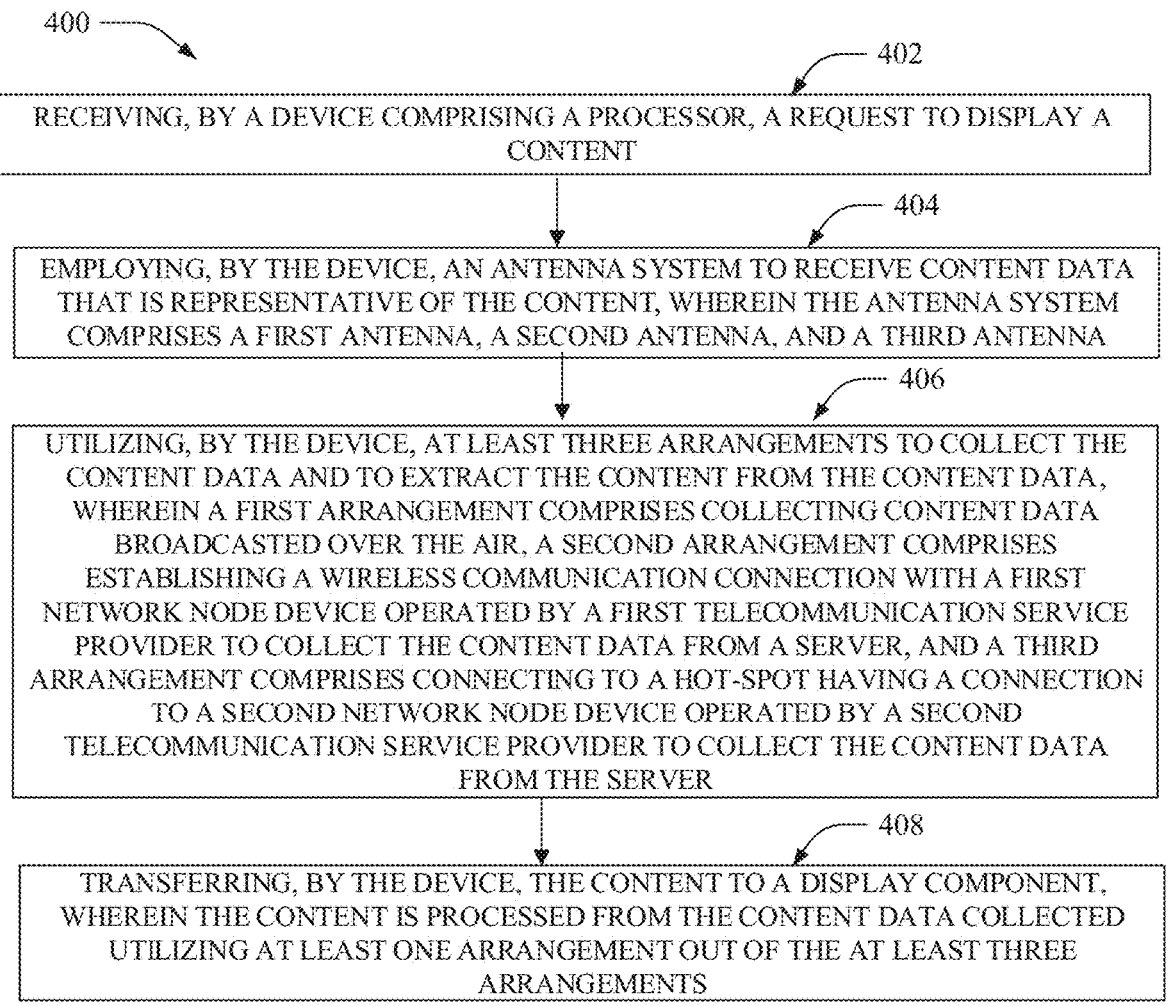
FIG. 4 depicts a diagram of an example, non-limiting computer implemented method that facilitates displaying a program using multiple technologies in accordance with one or more embodiments described herein.

FIG. 4 depicts a diagram of an example, non-limiting computer implemented method that facilitates displaying a program using multiple technologies in accordance with one or more embodiments described herein. In some examples, flow diagram 400 can be implemented by operating environment 900 described below. It can be appreciated that the operations of flow diagram 400 can be implemented in a different order than is depicted.

In non-limiting example embodiments, a computing device (or system) (e.g., computer 902) is provided, the device or system comprising one or more processors and one or more memories that stores executable instructions that, when executed by the one or more processors, can facilitate performance of the operations as described herein, including the non-limiting methods as illustrated in the flow diagrams of FIG. 4.

Operation 402 depicts receiving, by a device comprising a processor, a request to display a content (e.g. user select a program from an EPG). Operation 404 depicts employing, by the device, an antenna system to receive content data that is representative of the content, wherein the antenna system comprises a first antenna, a second antenna, and a third antenna. Operation 406 depicts utilizing, by the device, at least three arrangements to collect the content data and to extract the content from the content data, wherein a first arrangement comprises collecting content data broadcasted over the air, a second arrangement comprises establishing a wireless communication connection with a first network node device operated by a first telecommunication service provider to collect the content data from a server, and a third arrangement comprises connecting to a hot-spot having a connection to a second network node device operated by a second telecommunication service provider to collect the content data from the server. Operation 408 depicts transferring, by the device, the content to a display component, wherein the content is processed from the content data collected utilizing at least one arrangement out of the at least three arrangements.

Figure 5:
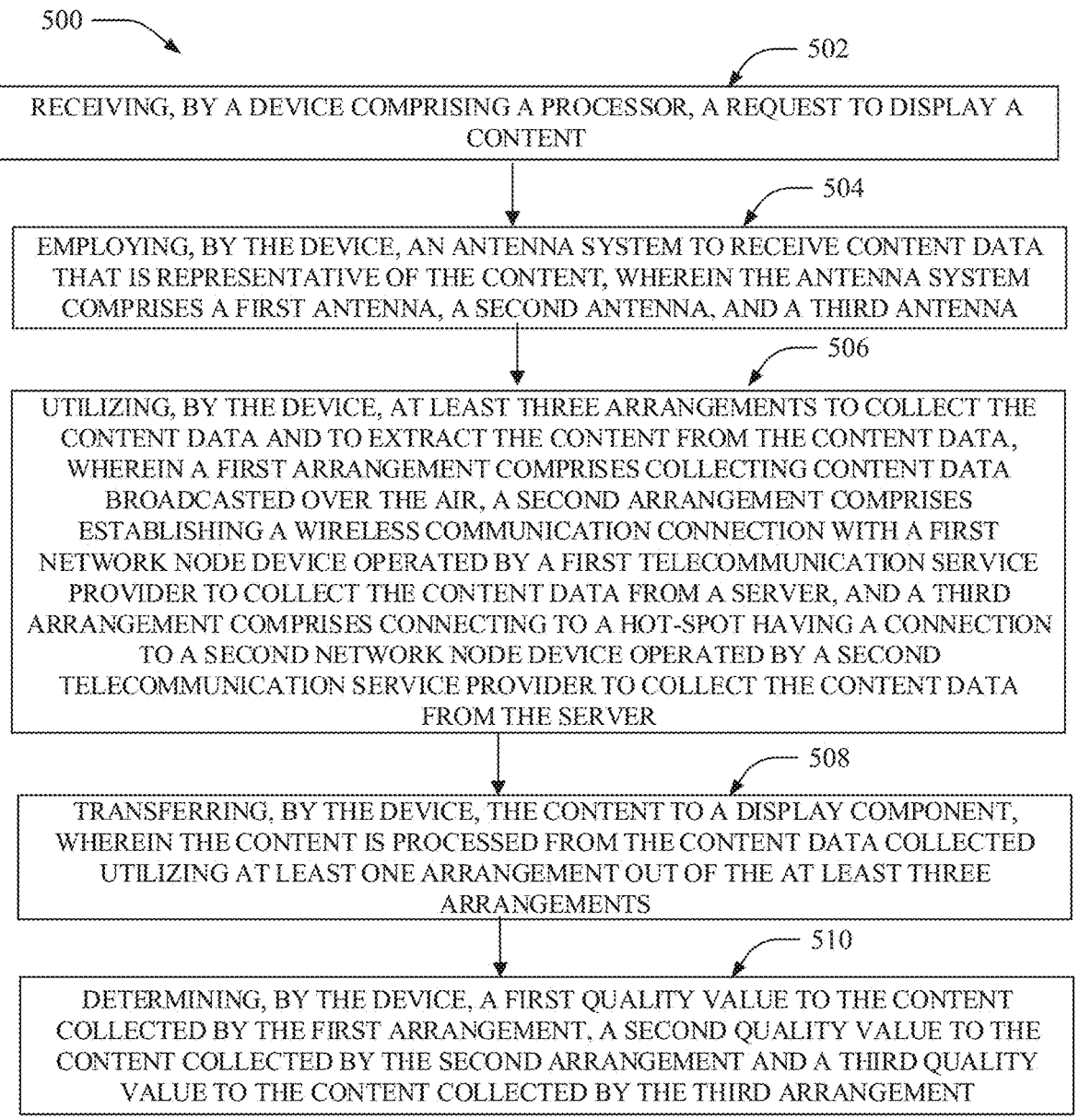
FIG. 5 depicts a diagram of an example, non-limiting computer implemented method that facilitates displaying a program using multiple technologies in accordance with one or more embodiments described herein.

FIG. 5 depicts a diagram of an example, non-limiting computer implemented method that facilitates displaying a program using multiple technologies in accordance with one or more embodiments described herein. In some examples, flow diagram 500 can be implemented by operating environment 900 described below. It can be appreciated that the operations of flow diagram 500 can be implemented in a different order than is depicted.

In non-limiting example embodiments, a computing device (or system) (e.g., computer 902) is provided, the device or system comprising one or more processors and one or more memories that stores executable instructions that, when executed by the one or more processors, can facilitate performance of the operations as described herein, including the non-limiting methods as illustrated in the flow diagrams of FIG. 5.

Operation 502 depicts receiving, by a device comprising a processor, a request to display a content (e.g. user select a program from an EPG). Operation 504 depicts employing, by the device, an antenna system to receive content data that is representative of the content, wherein the antenna system comprises a first antenna, a second antenna, and a third antenna. Operation 506 depicts utilizing, by the device, at least three arrangements to collect the content data and to extract the content from the content data, wherein a first arrangement comprises collecting content data broadcasted over the air, a second arrangement comprises establishing a wireless communication connection with a first network node device operated by a first telecommunication service provider to collect the content data from a server, and a third arrangement comprises connecting to a hot-spot having a connection to a second network node device operated by a second telecommunication service provider to collect the content data from the server. Operation 508 depicts transferring, by the device, the content to a display component, wherein the content is processed from the content data collected utilizing at least one arrangement out of the at least three arrangements. Operation 510 depicts determining, by the device, a first quality value to the content collected by the first arrangement, a second quality value to the content collected by the second arrangement and a third quality value to the content collected by the third arrangement.

Figure 6:
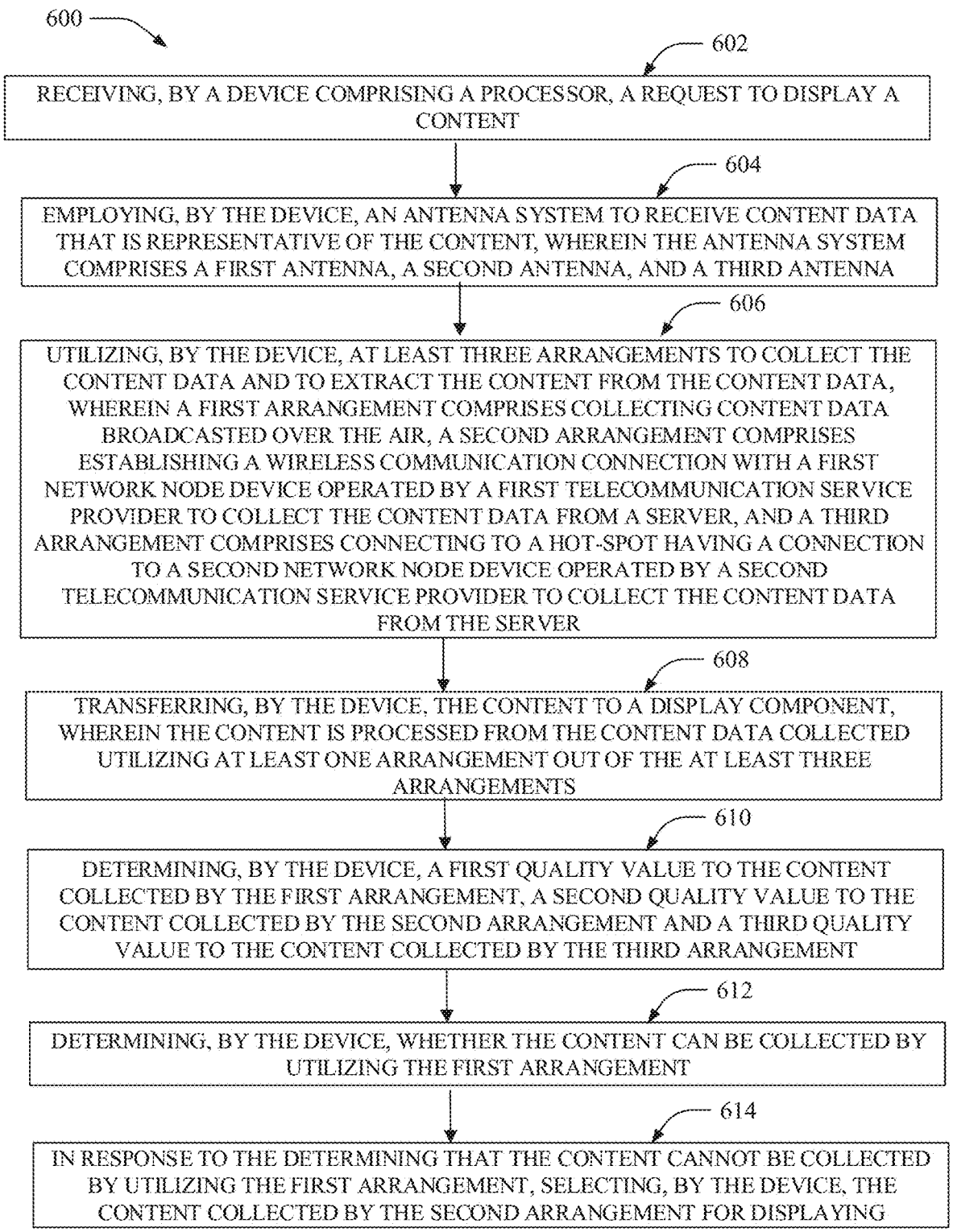
FIG. 6 depicts a diagram of an example, non-limiting computer implemented method that facilitates displaying a program using multiple technologies in accordance with one or more embodiments described herein.

FIG. 6 depicts a diagram of an example, non-limiting computer implemented method that facilitates displaying a program using multiple technologies in accordance with one or more embodiments described herein. In some examples, flow diagram 600 can be implemented by operating environment 900 described below. It can be appreciated that the operations of flow diagram 600 can be implemented in a different order than is depicted.

In non-limiting example embodiments, a computing device (or system) (e.g., computer 902) is provided, the device or system comprising one or more processors and one or more memories that stores executable instructions that, when executed by the one or more processors, can facilitate performance of the operations as described herein, including the non-limiting methods as illustrated in the flow diagrams of FIG. 6.

Operation 602 depicts receiving, by a device comprising a processor, a request to display a content (e.g. user select a program from an EPG). Operation 604 depicts employing, by the device, an antenna system to receive content data that is representative of the content, wherein the antenna system comprises a first antenna, a second antenna, and a third antenna. Operation 606 depicts utilizing, by the device, at least three arrangements to collect the content data and to extract the content from the content data, wherein a first arrangement comprises collecting content data broadcasted over the air, a second arrangement comprises establishing a wireless communication connection with a first network node device operated by a first telecommunication service provider to collect the content data from a server, and a third arrangement comprises connecting to a hot-spot having a connection to a second network node device operated by a second telecommunication service provider to collect the content data from the server. Operation 608 depicts transferring, by the device, the content to a display component, wherein the content is processed from the content data collected utilizing at least one arrangement out of the at least three arrangements. Operation 610 depicts determining, by the device, a first quality value to the content collected by the first arrangement, a second quality value to the content collected by the second arrangement and a third quality value to the content collected by the third arrangement. Operation 612 depicts determining, by the device, whether the content can be collected by utilizing the first arrangement. Operation 614 depicts in response to the determining that the content cannot be collected by utilizing the first arrangement, selecting, by the device, the content collected by the second arrangement for displaying.

Figure 7:
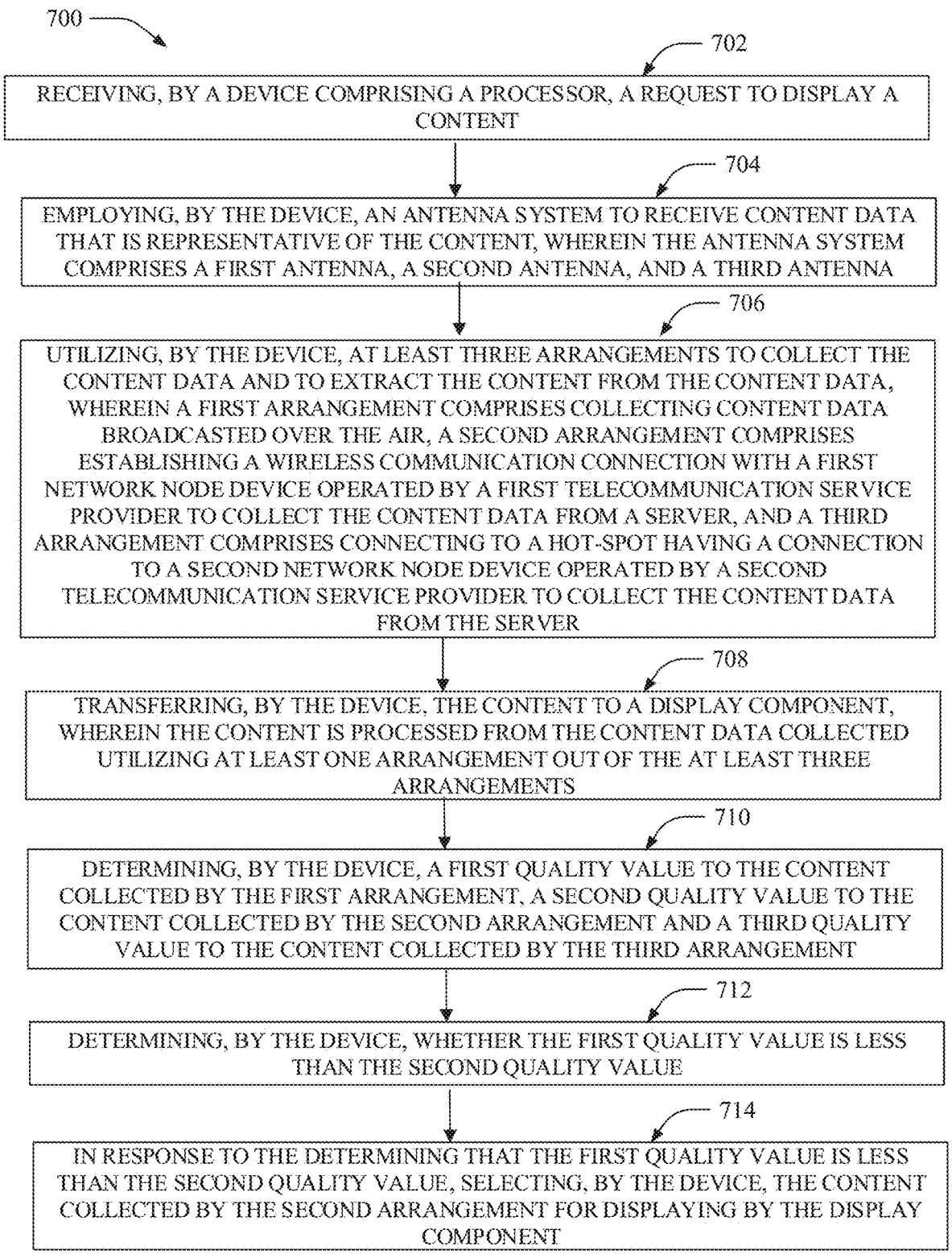
FIG. 7 depicts a diagram of an example, non-limiting computer implemented method that facilitates displaying a program using multiple technologies in accordance with one or more embodiments described herein.

FIG. 7 depicts a diagram of an example, non-limiting computer implemented method that facilitates displaying a program using multiple technologies in accordance with one or more embodiments described herein. In some examples, flow diagram 700 can be implemented by operating environment 900 described below. It can be appreciated that the operations of flow diagram 700 can be implemented in a different order than is depicted.

In non-limiting example embodiments, a computing device (or system) (e.g., computer 902) is provided, the device or system comprising one or more processors and one or more memories that stores executable instructions that, when executed by the one or more processors, can facilitate performance of the operations as described herein, including the non-limiting methods as illustrated in the flow diagrams of FIG. 7.

Operation 702 depicts receiving, by a device comprising a processor, a request to display a content (e.g. user select a program from an EPG). Operation 704 depicts employing, by the device, an antenna system to receive content data that is representative of the content, wherein the antenna system comprises a first antenna, a second antenna, and a third antenna. Operation 706 depicts utilizing, by the device, at least three arrangements to collect the content data and to extract the content from the content data, wherein a first arrangement comprises collecting content data broadcasted over the air, a second arrangement comprises establishing a wireless communication connection with a first network node device operated by a first telecommunication service provider to collect the content data from a server, and a third arrangement comprises connecting to a hot-spot having a connection to a second network node device operated by a second telecommunication service provider to collect the content data from the server. Operation 708 depicts transferring, by the device, the content to a display component, wherein the content is processed from the content data collected utilizing at least one arrangement out of the at least three arrangements. Operation 710 depicts determining, by the device, a first quality value to the content collected by the first arrangement, a second quality value to the content collected by the second arrangement and a third quality value to the content collected by the third arrangement. Operation 712 depicts determining, by the device, whether the first quality value is less than the second quality value. Operation 714 depicts in response to the determining that the first quality value is less than the second quality value, selecting, by the device, the content collected by the second arrangement for displaying by the display component.

Figure 8:
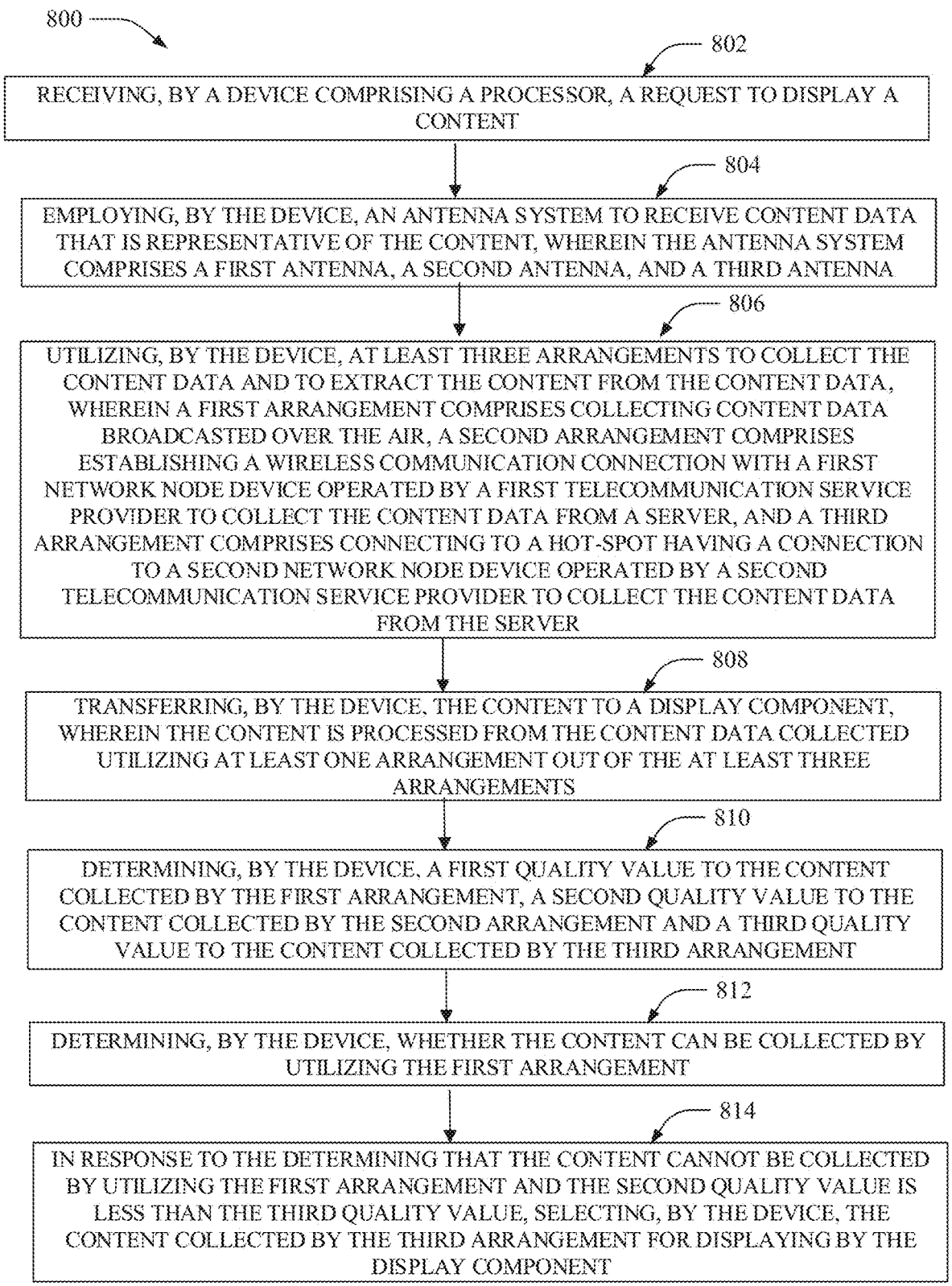
FIG. 8 depicts a diagram of an example, non-limiting computer implemented method that facilitates displaying a program using multiple technologies in accordance with one or more embodiments described herein.

FIG. 8 depicts a diagram of an example, non-limiting computer implemented method that facilitates displaying a program using multiple technologies in accordance with one or more embodiments described herein. In some examples, flow diagram 800 can be implemented by operating environment 900 described below. It can be appreciated that the operations of flow diagram 800 can be implemented in a different order than is depicted.

In non-limiting example embodiments, a computing device (or system) (e.g., computer 902) is provided, the device or system comprising one or more processors and one or more memories that stores executable instructions that, when executed by the one or more processors, can facilitate performance of the operations as described herein, including the non-limiting methods as illustrated in the flow diagrams of FIG. 8.

Operation 802 depicts receiving, by a device comprising a processor, a request to display a content (e.g. user select a program from an EPG). Operation 804 depicts employing, by the device, an antenna system to receive content data that is representative of the content, wherein the antenna system comprises a first antenna, a second antenna, and a third antenna. Operation 806 depicts utilizing, by the device, at least three arrangements to collect the content data and to extract the content from the content data, wherein a first arrangement comprises collecting content data broadcasted over the air, a second arrangement comprises establishing a wireless communication connection with a first network node device operated by a first telecommunication service provider to collect the content data from a server, and a third arrangement comprises connecting to a hot-spot having a connection to a second network node device operated by a second telecommunication service provider to collect the content data from the server. Operation 808 depicts transferring, by the device, the content to a display component, wherein the content is processed from the content data collected utilizing at least one arrangement out of the at least three arrangements. Operation 810 depicts determining, by the device, a first quality value to the content collected by the first arrangement, a second quality value to the content collected by the second arrangement and a third quality value to the content collected by the third arrangement. Operation 812 depicts determining, by the device, whether the content can be collected by utilizing the first arrangement. Operation 814 depicts in response to the determining that the content cannot be collected by utilizing the first arrangement and the second quality value is less than the third quality value, selecting, by the device, the content collected by the third arrangement for displaying by the display component.

Figure 9:
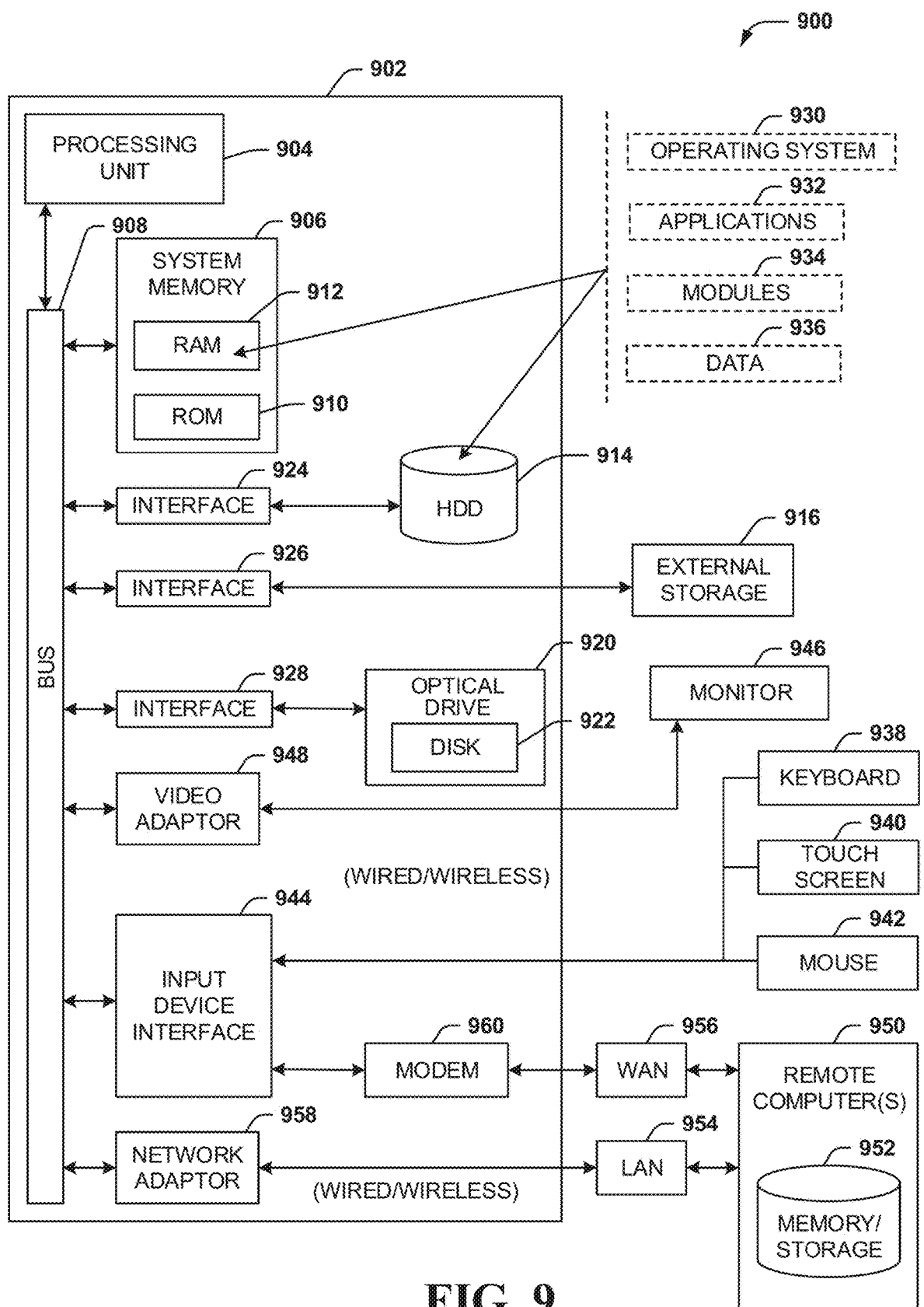
FIG. 9 illustrates an example block diagram of an example computer 900 operable to engage in a system architecture that facilitates wireless communications according to one or more embodiments described herein.

Referring now to FIG. 9, illustrated is an example block diagram of an example computer 900 operable to engage in a system architecture that facilitates wireless communications according to one or more embodiments described herein. The computer 900 can provide networking and communication capabilities between a wired or wireless communication network and a server and/or communication device.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and an optical disk drive 920 (e.g., which can read or write from a CD-ROM disc, a DVD, a BD, etc.). While the internal HDD 914 is illustrated as located within the computer 902, the internal HDD 914 can also be configured for external use in a suitable chassis (not shown). Additionally, while not shown in environment 900, a solid state drive (SSD) could be used in addition to, or in place of, an HDD 914. The HDD 914, external storage device(s) 916 and optical disk drive 920 can be connected to the system bus 908 by an HDD interface 924, an external storage interface 926 and an optical drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enable with a security module, such as a trusted processing module (TPM). For instance, with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can be also connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are example and other means of establishing a communications link between the computers can be used.

When used in either a LAN or WAN networking environment, the computer 902 can access cloud storage systems or other network-based storage systems in addition to, or in place of, external storage devices 916 as described above. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," "relay device," "node," "point," and the like, are utilized interchangeably in the subject application, and refer to a wireless network component or appliance that serves and receives data, control, voice, video, sound, gaming, or substantially any datastream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25;

powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the description is not to be limited to any single implementation, but rather is to be construed in breadth, spirit and scope in accordance with the appended claims.

What is claimed is:

1. A system, comprising:
a processor; and
a memory that stores executable instructions that, when executed by the processor, facilitate performance of operations, comprising:
receiving a request to display a content;
employing an antenna system to receive content data that are representative of the content, wherein the antenna system comprises a first antenna and a second antenna;
utilizing a first arrangement comprising the first antenna that collects content data broadcast using over the air signals;
assigning a first quality value to the content data collected by the first arrangement; and, if the first quality value is below an acceptable level,
utilizing a second arrangement comprising the second antenna that collects content data as transmitted using a wireless communication protocol;
assigning a second quality value to the content data collected by the second arrangement;
employing a third arrangement including a wired connection to collect content data provided;
assigning a third quality value to the content data collected by the third arrangement; and
transmitting one of the content data collected by the first arrangement, the content data collected by the second arrangement, or the content data collected by the third arrangement to a display component.

2. The system of claim 1, wherein the operations further comprise:
determining whether the first quality value is less than the second quality value; and
in response to the determining that the first quality value is less than the second quality value,
selecting the content data collected by the second arrangement for transmission to the display component.

3. The system of claim 1, wherein the wireless communication protocol is a protocol for a long-range wireless communication connection.

4. The system of claim 3, wherein the long-range wireless communication connection operates in accordance the group consisting of GSM, GPRS, LTE, HSPA, WiMAX, CDMA, TDMA, OFDMA, UMTS and 3G/4G/5G radio technologies.

5. The system of claim 3, wherein the content data as transmitted using a wireless communication protocol is collected from a network node device operated by a first telecommunication service provider.

6. The system of claim 1, wherein the wireless communication protocol is a protocol for a short-range wireless communication connection.

7. The system of claim 6, wherein the short-range wireless communication connection operates in accordance with the group consisting of WiFi, IEEE 802.11a/b/g/n/ac/ax, Bluetooth, and infra-red technology.

8. The system of claim 6, wherein the content data as transmitted using a wireless communication protocol is collected from a hot spot having a connection to a second network node device operated by a second telecommunication service provider.

9. The system of claim 1, wherein the display component provides data associated with the transmitted content data to a display device using a wireless communication link.

10. A system, comprising:
a processor; and
a memory that stores executable instructions that, when executed by the processor, facilitate performance of operations, comprising:
receiving a request to display a content;
employing an antenna system to receive content data that are representative of the content, wherein the antenna system comprises a first antenna, a second antenna, and a third antenna;
utilizing a first arrangement comprising the first antenna that collects content data broadcast using over the air signals;
assigning a first quality value to the content data collected by the first arrangement; and, if the first quality value is below an acceptable level,
utilizing a second arrangement comprising the second antenna that collects content data as transmitted using a first wireless communication protocol;

utilizing a third arrangement comprising the third antenna that collects content data as transmitted using a second wireless communication protocol; and transmitting one of the content data collected by the first arrangement or the content data collected by the second arrangement or the content data collected by the third arrangement to a display component;

assigning a second quality value to the content data collected by the second arrangement; and assigning a third quality value to the content data collected by the third arrangement;

employing a fourth arrangement, wherein the fourth arrangement comprises an Ethernet connection to collect the content, wherein for the second arrangement the wireless communication protocol is a protocol for a long-range wireless communication connection; and facilitating support for a return path communication protocol associated with advance television systems committee (ATSC) standard utilizing a combination of the second arrangement and the third arrangement.

11. The system of claim 10, wherein the operations further comprise:

determining whether the first quality value is less than the second quality value and whether the second quality value is less than the third quality value; and selecting, in response to determining that the first quality value is less than the second quality value and that the second quality value is less than the third quality value, the content data collected by the third arrangement for transmission to the display component.

12. A non-transitory computer readable storage medium that includes executable instructions, which when executed by a processor, facilitate performance of operations, comprising:

receiving a request to display a content;

employing an antenna system to receive content data that are representative of the content, wherein the antenna system comprises a first antenna and a second antenna;

utilizing a first arrangement comprising the first antenna that collects content data broadcast using over the air signals;

assigning a first quality value to the content data collected by the first arrangement; and utilizing, if the first quality value is below an acceptable level, a second arrangement comprising the second antenna that collects content data as transmitted using a wireless communication protocol;

assigning a second quality value to the content data collected by the second arrangement;

assigning a second quality value to the content data collected by the second arrangement;

employing a third arrangement, wherein the third arrangement comprises an Ethernet connection to collect the content;

assigning a third quality value to the content data collected by the third arrangement; and transmitting one of the content data collected by the first arrangement or the content data collected by the second arrangement or the content collected by the third arrangement to a display component based on quality score.

13. The medium of claim 12, wherein the operations further comprise:

determining whether the first quality value is less than the second quality value; and in response to the determining that the first quality value is less than the second quality value, selecting the content data collected by the second arrangement for transmission to the display component.

14. The medium of claim 12, wherein the wireless communication protocol is a protocol for a long-range wireless communication connection.

15. The medium of claim 14, wherein the content data as transmitted using a wireless communication protocol is collected from a network node device operated by a first telecommunication service provider.

16. The medium of claim 12, wherein the wireless communication protocol is a protocol for a short-range wireless communication connection.

17. The medium of claim 16, wherein the content data as transmitted using a wireless communication protocol is collected from a hot spot having a connection to a second network node device operated by a second telecommunication service provider.

* * * * *